Dec. 30, 1969     S. HANSEN     3,486,238
TILT METER
Filed Aug. 2, 1967     2 Sheets-Sheet 1
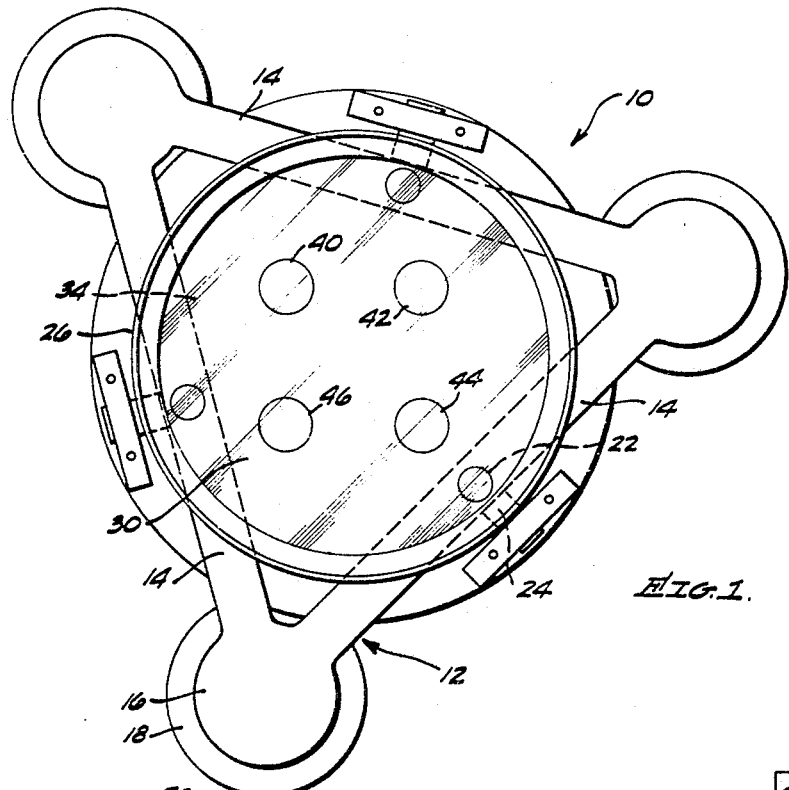
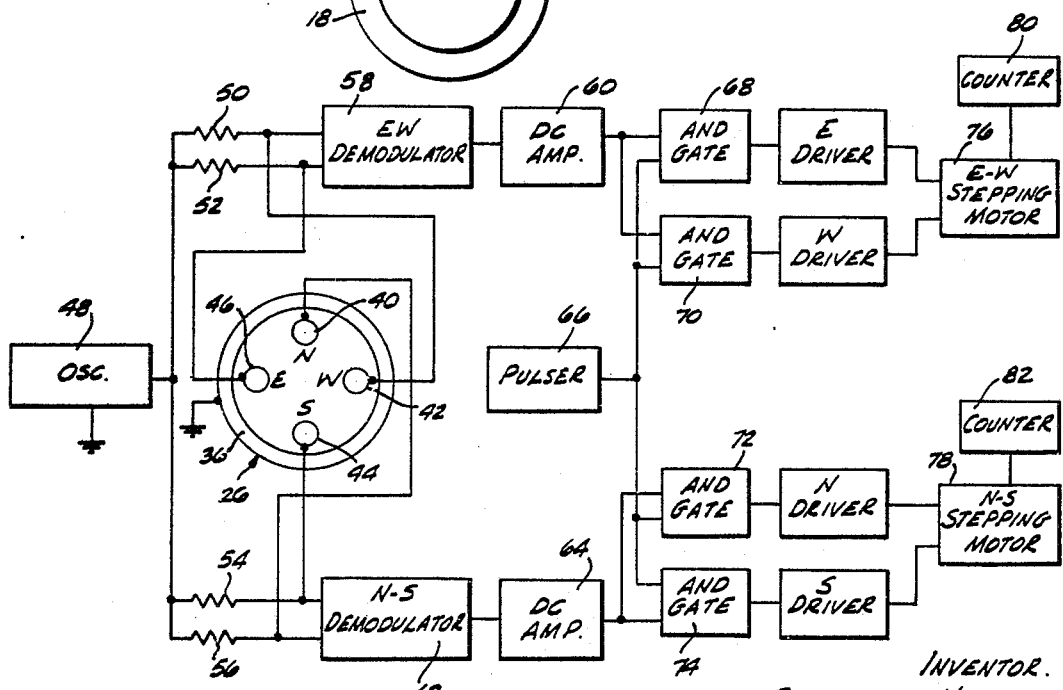
INVENTOR.
SIEGFRIED HANSEN,
BY
Allen A. Dicke, Jr.,
AGENT.

Dec. 30, 1969  S. HANSEN  3,486,238
TILT METER
Filed Aug. 2, 1967  2 Sheets-Sheet 2
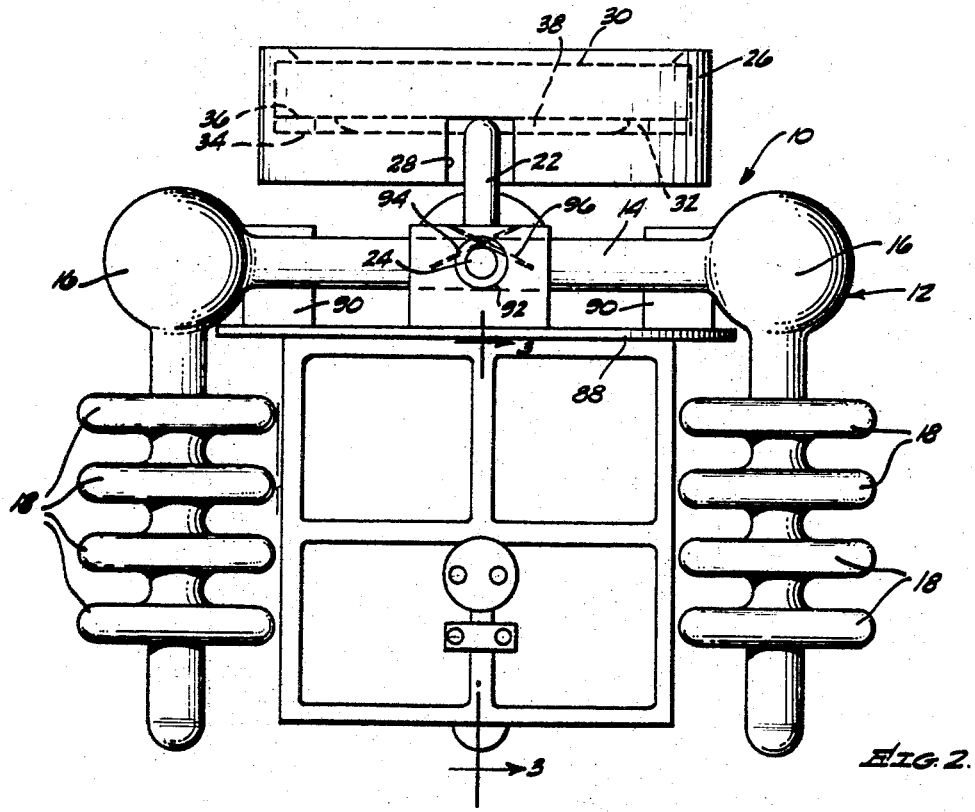
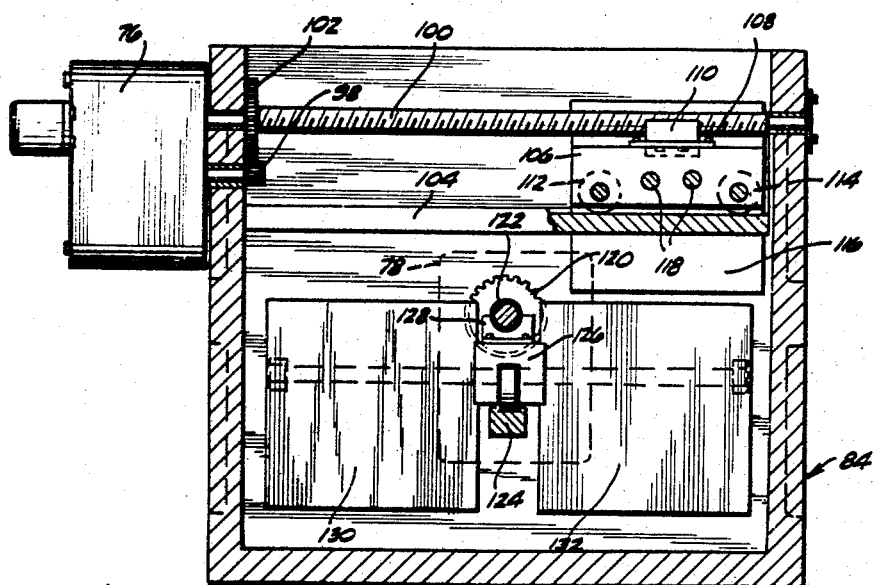

United States Patent Office 3,486,238
Patented Dec. 30, 1969

3,486,238
TILT METER
Siegfried Hansen, Los Angeles, Calif., assignor to Hughes Aircraft Company, Culver City, Calif., a corporation of Delaware
Continuation-in-part of application Ser. No. 519,673, Jan. 10, 1966. This application Aug. 2, 1967, Ser. No. 659,565
(Filed under Rule 47(b) and 35 U.S.C. 118)
Int. Cl. G01c 9/00, 9/24
U.S. Cl. 33—211                10 Claims

ABSTRACT OF THE DISCLOSURE

The tilt meter relies upon a bubble under a flat surface and in a viscous liquid to indicate direction and amount of tilt from a predetermined horizontal reference plane by the direction of motion of the bubble within the viscous liquid. The flat surface is mounted upon resilient supports, and the flat surface carries weights thereunder. The weights are moved responsive to bubble motion to rebalance the flat upper surface upon the resilient supports. The movement of the weights may be recorded by analog or digital read-out devices to indicate the changes in the tilt of the reference plane.

CROSS-REFERENCE

This application is a continuation-in-part of application Ser. No. 519,673, filed Jan. 10, 1966, entitled Precision Tilt Meter now Patent No. 3,409,993.

BACKGROUND

The detection of the angular difference between a subject plane and the reference plane has long been measured by means of bubble levels. The bubble levels of the past have generally fallen either into the class of those having tubular vials which are portions of the tubular toroid, or those which are portions of a hollow sphere. The toroidal types can detect and measure angular differences in the plane of the toroid and the spherical type can detect and measure angular differences in any direction. The sensitivity of either type depends upon the radius of curvature of either type depends upon the radius of curvature of the curved surface under which the bubble rests. For a given angle of tilt, the indication will be equal to the angle of tilt in radians multiplied by the radius of curvature. To increase sensitivity it is only necessary to increase the radius of curvature. However, the limit of sensitivity is reached just before the toroidal level becomes linear and the spherical level becomes flat. Once the spherical level is flat, it is the velocity of motion of the bubble in the viscous fluid which is proportional to the angle being measured, rather than its angular motion.

The prior invention, identified above, detects the bubble position and relevels the flat under which the bubble rests by means of control of the supports upon which the flat is supported.

SUMMARY

The present invention is directed to the positioning of a flat plate parallel to a reference plane. The flat plate is mounted upon resilient supports and the resilient supports in turn are mounted upon a base. Motion of the base causes motion of the plate away from parallelism from its reference plane. This deflection causes movement of a bubble underneath the flat plane. This movement in turn signals correcting means to return the flat plate to its parallel position. The signal means can be of any desired character, such as photoelectric detection of bubble position, but electric detection of bubble position is preferred. In the preferred case, the liquid surrounding the bubble is conductive and the electrodes are positioned so that bubble position is signaled. Through suitable electrical and mechanical components correction of the level of the flat plate is achieved.

The flat plate is mounted upon resilient supports. Counterbalancing weights are mounted upon the flat plate and these counterbalancing weights are movable with respect to the flat plate to change its center of gravity. This in turn causes the plate to angularly move with respect to the reference plane by resilient deflection of the supporting means. Either the electric signals causing repositioning of the weights, or the mechanical signal resulting from repositioning the weights can be used as drive means for analog or digital output signals. Thus, any position correction is signaled.

Accordingly, an object of the present invention is to provide a relatively simple improved system for maintaining a surface or plane substantially parallel to a horizontal reference plane. Another object of the present invention is to provide an improved precision tilt meter having an increased sensitivity and improved resolution. A further object of the present invention is the provision of a highly stable, high resolution tilt meter defining the variations in the tilt of a surface under observation with respect to a reference surface in a digitized representation. A further object of the present invention is the provision of a highly stable, high resolution tilt meter defining the tilt of a surface with respect to a reference surface in digitized representation. Still a further object of the present invention is the provision of a tilt meter utilizing a shiftable mass balancing system operable in response to digital sginals representative of the change of tilt of a surface under observation with respect to a reference surface.

DESCRIPTION OF THE DRAWING

FIGURE 1 is a top plan view of the tilt meter of this invention.

FIGURE 2 is a side elevational view thereof.

FIGURE 3 is an enlarged section taken generally along line 3—3 of FIGURE 2 showing a portion of the internal construction.

FIGURE 4 is a schematic illustration of the electrical circuit employed to provide a signal output from the mechanical structure.

DESCRIPTION

The mechanical construction of the tilt meter 10 of the present invention is clearly shown in FIGURES 1, 2 and 3. Basically, the tilt meter 10 comprises a hollow fused quartz tripod support 12 which is formed by three equilateral triangle sides 14 which are connected by bulbous junctions 16 from which three equilateral hollow bellows shaped feet 18 extend downwardly to rest upon a geologic, or other critical surface, whose inclination or tilt is being observed. Each of the sides 14 is provided at its midpoint with an upwardly extending lug 22 and an outwardly extending lug 24. The upstanding lugs 22 are utilized to support an optically flat bubble sensor 26, which is similar in construction to the bubble sensor disclosed in applicant's previously cited application. In the device of the present invention, the bubble sensor 26 is provided with three recesses 28 equilaterally disposed in its rim whereby the upstanding lugs 22 engage directly with the optically flat fused quartz bubble disc 30. In this manner the bubble sensor 26 is supported entirely by a fused quartz supporting structure between the bubble sensor and the geologic or other critical surface 20. Such an arrangement minimizes dimensional inaccuracies introduced by thermal changes caused by ambient temperature changes occurring at the site where the tilt meter is employed.

Sensor 26 comprises a closed chamber 32 which is closed on its top by means of a lower side of the optically flat fused quartz disc 30. The bottom 34 of the closed chamber 32 is made of electrically insulative material, while its outer periphery is closed by electrically conducted ring 36. Within the chamber is a quantity of electrically conductive liquid of fairly low viscosity. Ethyl alcohol is a suitable liquid. Sufficient liquid is provided within the chamber to substantially fill the chamber but allow enough space for the creation of a large bubble 38 on the underside of the disc 30. Because of the shallow depth of the chamber 32, the bubble 38 substantially reaches the bottom thereof.

Electrodes 40, 42, 44 and 46 are orthogonally positioned on the bottom 34. They face into the chamber and are electrically contactable by the liquid within the chamber. These electrodes are conncted into the electrical circuit as hereinafter described and signal deviations of the optically flat disc 30 from a position in which it is parallel to a reference plane. The reference plane is perpendicular to the local gravity. Since the feet 18 are referenced to a support surface, should the support change, the underside of optical flat 30 will depart from its parallelism to this refrence plane. This causes the bubble to shift within the liquid. The signals from electrodes 40 through 46 indicate this shift from the original position.

Referring to FIGURE 4, oscillator 48 is connected to one side of resistances 50, 52, 54 and 56. The other side of these resistances are respectively connected to electrodes 42, 46, 44 and 40. Ring 36 is grounded, as is oscillator 48. Thus, a bridge is formed in which the resistances 50 through 56 form the fixed legs and the resistances from the electrodes 40 through 46 through the liquid to ring 36 form the variable legs of the bridge. The east/west level of the optical flat 30 is fed out as an analog signal at the outputs of resistances 52 and 50. The parallelism of the optical flat in the east/west direction to the reference plane is represented by these signals, and they are fed into demodulator 58. The signal out of modulator 58 is a DC signal which varies in accordance with the parallelism of the disc 30 in the east/west direction. This signal is connected to DC amplifier 60. Similarly, the parallelism of the underside of disc 30 in the north/south direction is read out as an analog signal in accordance with the variable resistance of the legs of the bridge represented by electrodes 40 and 44. This signal is read out at the outputs of resistances 54, 56 and is combined in north/south demodulator 62. The demodulator 62 has an output signal which varies in accordance with the parallelism in the north/south direction. This signal is amplified by DC amplifier 64.

Pulser 66 is arranged to have an output of periodic pulses. Furthermore, the time interval between pulses, or the frequency of the pulses, can be varied in accordance with requirements. Pulser 66 has a pulse output which can be selected in frequency, in accordance with requirements. This output pulse signal is connected to AND gates 68, 70, 72 and 74. AND gates 68 and 70 also receive the output from amplifier 60 while AND gates 72 and 74 receive the output of amplifier 64. The gates are arranged with respect to the pulser output and with respect to the amplifier output so that one or the other of AND gates 68 and 70 has an output signal for each pulse of pulser 66. Which of the gates has the output signal is dependent upon the signal level at the output of amplifier 60. If driving in the east direction is desired, the signal from amplifier 60 is such as to fire AND gate 68 at each pulse. On the other hand, if driving in the west direction is desired, AND gate 70 fires with each pulser or pulse.

Similarly, one of AND gates 72 and 74 has an output pulse for each of the pulses from pulser 66. Which of the gates fired depends upon the output of amplifier 64 so as to provide an output signal indicative of the proper direction. A driver is connected to the output of each of the AND gates 68–74. These drivers are simply power amplifiers which emit a signal of sufficient power to drive a motor. The east and west driver amplifiers are connected to east/west stepping motor 76 while the outputs of the north and south drivers are connected to north/south stepping motor 78. These motors are arranged so that they make one angular step for each pulse, the direction of the step depending upon whether or not the signal is from the east driver or the west driver, or in the case of stepping motor 78, from the north driver or from the south driver. Suitable stepping motors for their application are obtainable from Sigma Instruments, Inc., Braintree, Mass. Series 9AD2 Cyclonome bidirectional stepping motors are suitable.

As far as external indication of tilt is concerned, an electrical digital signal is found at the outputs of the several drivers. Furthermore, an analog output signaling device can be connected to the outputs of the stepping motors 76 and 78. It is preferred, however, that digital output devices be connected to the outputs of the stepping motors. In this case, mechanical revolution counters are connected by stepup gearing to these stepping motor outputs. Furthermore, digital output signaling devices of electrical nature can be connected to the mechanical outputs of the stepping motors to emit signal pulses in accordance with the motor steps and the motor stepping direction. Such electrical signaling devices can give a remote output reading at a data collection center. Thus, in the usual uses of the tilt meter of this invention, such is the preferred output. Counters counting the direction and amount of rotation of the stepping motors are indicated at 80 and 82.

Referring principally to FIGURES 2 and 3, housing 84 is located beneath sides 14 of the suport 12. Housing 84 has top cover plate 88 upon which are supported three bosses 90. These bosses correspond to the outwardly extending lugs 24. Each of the bosses has a clearance hole 92 therein into which one of the lugs 24 extends. Angular rods 94 and 96 extend diagonally through the upper part of each of the clearance holes 92 to form bearing points for lug 24. By this construction, housing 84 can depend in only one position from the lugs 24. The lower part of housing 84 is secured to its top cover plate 88.

Referring principally to FIGURE 3, east/west stepping motor 76 is secured to one side of the housing. It has a pinion 98 extending into the housing. Lead screw 100 is rotatably mounted in the opposite sides of housing 84 and carries bull gear 102. Guide track 104 extends across the housing below the screw 100 so that both the lead screw 100 and guide track 104 lie substantially in a vertical plane which passes through electrodes 42 and 46.

Carriage 106 has spring 108 secured to the top thereof. Spring 108 is a flat leaf spring which is formed to provide an upward resilient thrust. Half nut 110 is mounted upon spring 108 and engages the underside of lead screw 100. On the other hand, carriage 106 carries support wheels 112 and 114 extending out of the lower side thereof and rotatably mounted thereon. Support wheels 112 and 114 are engaged upon guide track 104 to support the carriage structure and provide a reactive course for the upward thrust of half nut 110. A weight is secured to each side of carriage 106. One of the weights is shown at 116 and the other is on the near side of the section upon which FIGURE 3 is taken. The weights are secured in place on the carriage by means of bolts 118 which extend through the weights and through the carriage.

Similarly, motor 78 is mounted on housing 84 and drives lead screw 122 through a pinion, not shown, and bull gear 120. Positioned below lead screw 122, and parallel thereto, is track 124. Lead screw 122 and track 124 lie in a vertical plane which passes through the north/south electrodes 40 and 44. Identically to the lead screw, track and weight structure described above, carriage 126 is driven along track 124 by means of half nut 128 which is also spring urged up against its lead screw. Additionally, carriage 126 carries weights 130 and 132. Thus, the motors 76 and 78 drive weights in a direction substantially parallel to their corresponding contacts 40 through 46. Carriage 106 carries weights which change the center of gravity of the structures mounted upon sides 14 in the east/west direction and the weights 130 and 132 are driven to move the center of gravity in a direction parallel to contacts 40 and 44 in the north-south direction. This change in center of gravity changes the loading on the several feet 18, which are resilient, to thus change the level of the sides 14 of the structure supported thereon.

The above description discloses a structure which will level the bubble sensor of the tilt meter. The mechanical leveling structure of this invention is considered superior to the pneumatic system of my prior application. The pneumatic system requires air, which is inherently an analog device and does not lend itself to producing accurate digital output. For these reasons the described system of this invention is preferable. The force required for releveling is provided by the change in center of gravity due to the movement of the weights. Feet 18 are bellows shaped to be resilient and act as calibrated springs. The entire support structure 12 is preferably made out of quartz because of its dimensional stability over long periods and low thermal coefficient of expansion. The feet 18 are also made of quartz.

When the described digital system is used, the counter has a count range of 0 to 10,000, the counter makes 10 counts per revolution of the counter and is geared to the lead screw through a 6:1 speedup gearing so that one turn of the lead screw represents 60 counts. The pitch of the screw is 56 threads per inch. Hence the total count of 10,000 is represented by a travel of 2.976 inches. Each movable weight mass weighs 4.20 pounds and the spring constant of the tripod feet is 2500 pounds per inch. This feed is spaced 10 inches, center to center, on an equilateral triangle. These constants combine to give a sensitivity of $10^{-8}$ radians per count, or a full scale range of $10^{-4}$ radians. The differential compression of the feet for full scale travel of the weights is only about 0.001 inch.

In addition to providing a high resolution digital output, a principal advantage of the tilt meter of this invention is its excellent long term mechanical stability. This means that it can be placed in position and accurately signal movement of a surface on a long term basis. The only elements which are interposed directly between the bubble and the surface being measured are made entirely of fused quartz, which is an eminent material for this purpose as described above.

The principle anticipated use of the tilt meter of this invention is as a seismic investigative and signaling tool. It has long been suspected that the tilting of the earth's crust, with respect to speed and direction of tilt can be used to predict earthquakes. No instrument has previously been available which can be placed in the field or operated over a long term to investigate the possibility of this method of prediction. By the placement of one or more of the tilt meters in accordance with this invention and suitable locations, such can be investigated. If such proves feasible as an accurate method of earthquake prediction, more can be installed to feed data to a central location to provide an earthquake prediction data center. In such uses, it is essential that the tilt meter be secured to a surface 20 which is directly related to the earth's crust and is not subject to variations caused by surface ground shifting and by vibration. The tilt meter can be installed in a deep hole or mine, directly upon the bedrock. A preferred method of mounting comprises the insertion of quartz rods into holes in the bedrock, wherein they are cemented. The feet 18 of the tilt meter directly rest upon these rods so that direct mechanical connection between the feet and bedrock is obtained.

Once the instrument is set in place, it is probably not level so that the bubble is not in the center of the sensor disk. Pulser 66 is set to a high value of pulsing so that the stepping motors can quickly move the weights in the proper direction to center the bubble. After the center position has been reached, the pulser is slowed down so that the pulser rate and thus the digital sampling rate is reduced to 60 counts per minute or less. The best setting will be determined by experiment and is determined partially by the speed of the tilting which is being measured. It is thus seen that the described structure provides a tilt meter which is extremely accurate and highly reliable over long term operation.

This invention having been described in its preferred embodiment, it is clear that it is susceptible to numerous modifications and embodiments within the skill of the routine artisan and without the exercise of the inventive faculty.

What is claimed is:
1. A tilt meter, said tilt meter comprising:
a platform;
resilient support means connected to said platform for resiliently supporting said platform;
tilt detector means mounted upon said platform for detecting tilt of said platform, said tilt detector means comprising a plate having a flat bottom and having a closed chamber thereunder, a conductive liquid in said chamber, a bubble in said liquid, said bubble lying against said flat bottom of said plate and away from the bottom of said chamber, electrodes in said liquid in the bottom of said chamber, said electrodes signaling lateral position of said bubble in said chamber;
weight means movably mounted upon said platform to be movable with respect to said platform in such a direction as to change the tilt of said platform;
coupling means interconnecting said electrodes of said tilt detecting means and said weight means to move said weight means with respect to said platform to change the center of gravity of said platform mounted means to cause motion of said resilient support means to change the tilt of said platform and said tilt detecting means.

2. The tilt meter of claim 1 wherein output signaling means is connected to said coupling means so that motion of said weight with respect to said platform is signaled.

3. The tilt meter of claim 2 wherein said signaling means is digital signaling means.

4. The tilt meter of claim 1 wherein said tilt detector means detects tilt with respect to a reference plane and wherein said weight means comprises first and second weight means movable substantially at right angles with respect to each other and substantially parallel to the reference plane.

5. The tilt meter of claim 4 wherein said coupling means comprises drive means connected to each of said weights to move said weights at substantially right angles with respect to each other.

6. The tilt meter of claim 5 wherein each of said drive means comprises a screw, motor means connected to each of said screws, a nut on each of said weights, each of said nuts being in engagement with one of said screws, said motor means being connected to rotate said screws so that rotation of said screws causes motion of said weights along said screw.

7. The tilt meter of claim 6 wherein a track is positioned parallel to each of said screws, one of said weights being movably mounted upon each of said tracks so as to move along said tracks upon rotation of said screws.

8. The tilt meter of claim 7 wherein digital signaling means is connected to each of said motors, said digital signaling means signaling the rotation of said screws so as to signal the weight movement necessary to return said tilt detecting means to a position parallel to said reference plane.

9. The tilt meter of claim 1 wherein said tilt detecting means produces an analog signal indicating the direction of tilt of said tilt detecting means away from a reference plane, said signal being digitized by an AND gate and pulser, said AND gate being conductive only in the presence of both a pulse from said pulser and a tilt signal, said digital signal being connected to move said weight.

10. The tilt meter of claim 9 wherein the pulse output rate of said pulser is selectable so that the frequency or signal from said AND gate is selectable.

References Cited

UNITED STATES PATENTS

| | | | |
|---|---|---|---|
| 1,623,427 | 4/1927 | Manrock | 248—182 |
| 1,634,267 | 7/1927 | Nagy | 248—182 |
| 2,252,727 | 8/1941 | Pepper | 33—211 |
| 2,603,003 | 7/1952 | Braddon | 33—222.7 |
| 3,020,050 | 2/1962 | Remington | 338—86 |
| 3,051,007 | 8/1962 | Remington | 74—5.47 |

LEONARD FORMAN, Primary Examiner

DENNIS A. DEARING, Assistant Examiner

U.S. Cl. X.R.

33—206, 207